United States Patent [19]
Bender et al.

[11] 3,856,822
[45] Dec. 24, 1974

[54] 3-ALKENYL DIBENZO (B,D)PYRANS

[75] Inventors: Paul E. Bender, Willingboro, N.J.;
Bernard Loev, Broomall, Pa.

[73] Assignee: Smith Kline Corporation,
Philadelphia, Pa.

[22] Filed: July 18, 1973

[21] Appl. No.: 380,435

[52] U.S. Cl............................. 260/345.3, 424/283
[51] Int. Cl................................................ C07d 7/20
[58] Field of Search.................................. 260/345.3

[56] References Cited
FOREIGN PATENTS OR APPLICATIONS
651,653    4/1951    Great Britain................... 260/345.3

*Primary Examiner*—John M. Ford
*Attorney, Agent, or Firm*—Joan S. Keps; Richard D. Foggio; William H. Edgerton

[57] ABSTRACT

The compounds of this invention are 3-alkenyl dibenzo[b,d]pyrans having pharmacological activity such as central nervous system activity. A preferred compound of this invention is 3-(1,2-dimethylhept-1-enyl)-1-hydroxy-7,8,9,10-tetrahydro-6,6,9-trimethyl-6H-dibenzo[b,d]pyran.

5 Claims, No Drawings

3-ALKENYL DIBENZO (B,D)PYRANS

This invention relates to new 3-alkenyl dibenzo[b,d]-pyrans which have pharmacological activity.

The compounds of this invention are represented by the following structural formula:

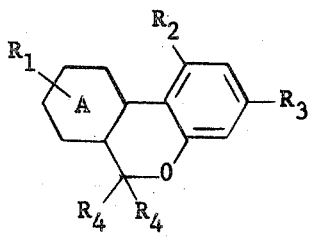

in which:

ring A is a benzene ring or a cyclohexene ring with the double bond being at position 6a–10a, 8 or 9;

$R_1$ is hydrogen, methyl or ethyl;

$R_2$ is hydrogen or OR' where R' is hydrogen or lower alkanoyl of from two to five carbon atoms;

$R_3$ is an alkenyl group optionally branched with from one to three branches, each branch consisting of one or two carbon atoms, with $R_3$ containing one double bond and having a total of from five to twelve carbon atoms; and $R_4$ is methyl or ethyl.

In the nomenclature used herein the dibenzo[b,d]-pyran ring is numbered as follows:

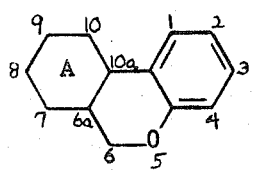

Preferred compounds of this invention are represented by Formula I in which ring A is a cyclohexane ring with the double bond at the 6a-10a position and $R_3$ is an alkenyl group optionally branched with from one to three methyl groups, with $R_3$ containing one double bond and having a total of from five to 12 carbon atoms.

Advantageous compounds of this invention are represented by Formula I where ring A is a cyclohexene ring with the double bond at position 6a-10a, $R_2$ is hydroxy or acetoxy and $R_3$ is an alkenyl group optionally branched with from one to three methyl groups, with $R_3$ containing one double bond and having a total of from five to 12 carbon atoms. Particularly advantageous compounds are those represented by Formula I where ring A is a cyclohexene ring with the double bond at position 6a-10a, $R_1$ is methyl in the 9-position, $R_2$ is hydroxy or acetoxy, $R_3$ is an alkenyl group optionally branched with from one to three methyl groups with $R_3$ containing one double bond and having a total of from five to 12 carbon atoms and $R_4$ is methyl.

Particularly preferred is the compound 3-(1,2-dimethylhept-1-enyl)-1-hydroxy-7,8,9,10-tetrahydro-6,6,9-trimethyl-6H-dibenzo[b,d]pyran. This compound is represented by the following structural formula:

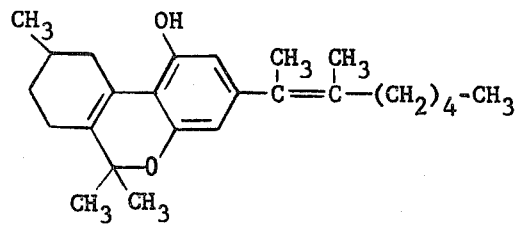

Due to the possibility of asymmetric carbon atoms in the side chain and in ring A, the compounds of this invention may exist as optical isomers. Cis and trans isomers may result due to the presence of the olefinic groups. All of the isomers, including separated isomers and mixtures thereof, are included within the scope of this invention.

The compounds of Formula I in which ring A is a cyclohexene ring with the double cyclohexene at the 6a-10a position and $R_2$ is hydrogen or hydroxy are prepared by condensation of a 2-carbalkoxycyclohexanone, for example 2-carbethoxycyclohexanone, with a 5-alkenyl resorcinol or 3-alkenyl phenol followed by treatment of the intermediate 3-alkenyl-7,8,9,10-tetrahydro-6H-dibenzo[b,d]pyrone with a methyl or ethyl magnesium halide and cyclization to the 3-alkenyl-7,8,9,10-tetrahydro-6H-dibenzo[b,d]pyran by addition of the reaction mixture to aqueous acid, for example dilute hydrochloric acid.

The compounds of Formula I in which ring A is a cyclohexene ring having the double bond at the 8 position and $R_2$ is hydrogen or hydroxy are prepared by condensing verbenol or an analog thereof with a 5-alkenyl resorcinol or 3-alkenyl phenol in the presence of acid such as p-toluenesulfonic acid or boron trifluoride etherate followed by treatment of the resulting adduct with boron trifluoride etherate by the procedure of Mechoulam et al. [*Arzneim.-Forsch.* 22: 1995 (1972)] as shown in the following scheme:

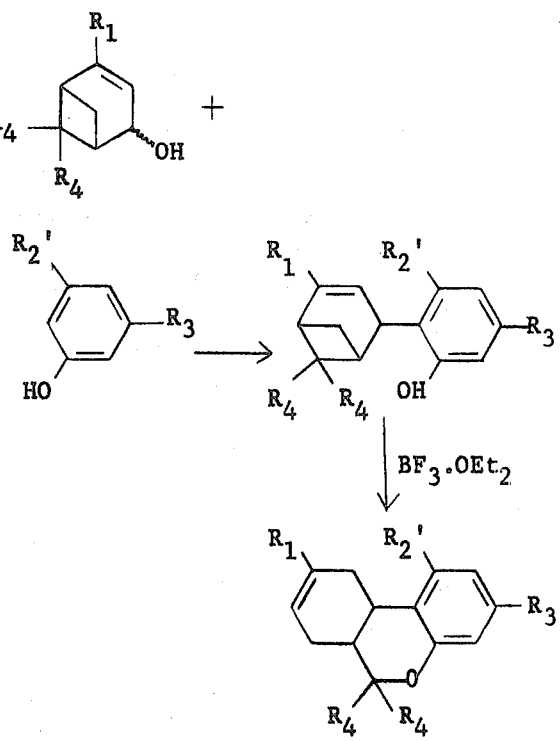

The terms $R_1$, $R_3$ and $R_4$ are defined as described above and $R_2'$ is hydrogen or hydroxy.

The compounds of Formula I in which ring A is a cyclohexene ring with the double bond at the 9 position and $R_2$ is hydrogen or hydroxy are prepared by isomerization of the corresponding compounds of Formula I with the cyclohexene double bond at the 8 position with zinc chloride and hydrogen chloride followed by treatment with base [Mechoulam, et al., *Arzneim.- Forsch.* 22:1995 (1972) and Petrzilka, et al., *Helv. Chim. Acta* 52:1102 (1969)].

Other procedures which may be applied to prepare these compounds are described by Fahrenholtz, et al., *J. Amer. Chem. Soc.* 89:5934 (1967), Mechoulam, et al., *J. Amer. Chem. Soc.* 89:4552 (1967) and Razdan, et al., *J. Amer. Chem. Soc.* 92:6061 (1970) and in U.S. Pat. No. 3,388,136.

The alkenyl substituted resorcinols and phenols used as starting materials are prepared by dehydration of a hydroxyalkyl substituted resorcinol or phenol by known procedures [*J. Amer. Chem. Soc.* 67:1534 (1945)]. During the dehydration process the phenolic hydroxy groups are protected as the easily removable methyl ethers.

The compounds of Formula I in which ring A is a benzene ring and $R_2$ is hydrogen or hydroxy are prepared by dehydrogenation of the corresponding compounds of Formula I in which ring A is a cyclohexene ring. The dehydrogenation is carried out either using a catalyst such as palladium on carbon or using a chemical dehydrogenation agent such as 2,3-dichloro-5,6-dicyanoquinone.

The compounds of Formula I in which $R'$ is lower alkanoyl are prepared from the corresponding hydroxy compounds by conventional methods, for example, by reacting the hydroxy compound with a lower alkanoic acid anhydride or a lower alkanoyl halide.

The compounds of this invention have pharmacological activity such as central nervous system activity; for example the compounds have central nervous system depressant, sedative and tranquilizing activity. In addition, the compounds may have analgesic, hypotensive, gastric acid secretion inhibitory, anti-inflammatory and diuretic activity.

The central nervous system activity is demonstrated by oral administration to rats at doses of about 0.5 to 50 mg./kg. to produce effects such as decreased spontaneous motor activity.

One skilled in the art will recognize that in determining the amounts of the compound to produce the desired pharmacological effect, the activity of the compound as well as the size of the host animal must be considered.

The compounds of this invention may be combined with standard pharmaceutical carriers and administered internally in conventional dosage forms such as capsules, tablets or liquid preparations.

The following examples illustrate the invention but are not to be construed as limiting the scope thereof. Temperatures are in degrees Centigrade unless otherwise stated.

EXAMPLE 1

3-(1,2-Dimethylhept-1-enyl)-1-hydroxy-7,8,9,10-tetrahydro-6,6,9-trimethyl-6H-dibenzo[b,d]pyran and 3-(1-methylenyl-2-methylheptyl)-1-hydroxy-7,8,9,10-tetrahydro-6,6,9-trimethyl-6H-dibenzo[b,d]pyran Dehydration of 68.6 g. (0.25 mol.) of 5-(1,2-dimethyl-1-hydroxyheptyl)resorcinol dimethyl ether [*J. Amer. Chem. Soc.* 70:664 (1948)] by distillation from a few drops of 20% aqueous sulfuric acid gave a mixture of 5-(1,2-dimethyl-cis and trans-hept-1-enyl) and 5-(1-methylenyl-2-methylheptyl)resorcinol dimethyl ethers, b.p. 132°–134° (1.0 mm.). The mixture of resorcinols may be separated at this point by standard wet or dry column chromatographic methods using a silver nitrate impregnated column.

A solution of 5.4 g. (0.020 mol.) of a mixture of the resorcinol dimethyl ethers in ether was added to the Grignard reagent prepared from 1.96 g. (0.080 mol.) of magnesium turnings and 11.4 g. (0.080 mol.) of methyl iodide in 200 ml. of anhydrous ether. The solvent was evaporated under nitrogen on a steam bath and the residue was heated at 150°–170° for 25 minutes. Ice was cautiously added to the cold viscous mixture, followed by ether and dilute hydrochloric acid. The organic phase was washed ($H_2O$), dried ($MgSO_4$) and the solvent was evaporated to give a mixture of the olefinic resorcinols.

To a stirred solution of 3.3 g. (0.014 mol.) of a mixture of 5-(1,2-dimethylhept-1-enyl)resorcinol and 5-(1-methylenyl-2-methylheptyl)resorcinol and 2.57 g. (0.014 mol.) of 5-methyl-2-carbethoxycyclohexanone in 50 ml. of benzene was added a solution of 2.17 g. (0.014 mol.) of phosphorus oxychloride in 5 ml. of benzene. After one hour the reaction mixture was refluxed for 5 minutes, then allowed to stir at 25° for 24 hours. Water was then added and the mixture was refluxed for 15 minutes and ethyl acetate was added. The layers were separated and the organic phase was washed with 5% aqueous sodium bicarbonate, dried ($MgSO_4$) and concentrated. The residue was triturated with a minimum amount of 40% aqueous sodium hydroxide. The precipitate which formed was filtered, washed with benzene and 10% aqueous sodium hydroxide, acidified with dilute hydrochloric acid and extracted into benzene. The benzene solution was dried ($MgSO_4$) and concentrated to give a mixture of 3-(1,2-dimethylhept-1-enyl)-1-hydroxy-7,8,9,10-tetrahydro-9-methyl-6H-dibenzo[b,d]pyrone and 3-(1-methylenyl-2-methylheptyl)-1-hydroxy-7,8,9,10-tetrahydro-9-methyl-6H-dibenzo[b,d]pyrone as an oil.

A solution of 2.7 g. (7.6 mol.) of the above prepared dibenzo[b,d]pyrones in benzene was added to a stirred solution of 50 ml. (0.1 mol.) of a solution of methyl magnesium bromide in benzene-tetrahydrofuran under nitrogen. After refluxing for 18 hours, the solution was slowly poured with stirring onto 300 ml. of ice-water containing 40 ml. of concentrated hydrochloric acid. The cold mixture was extracted with ether and the organic phase was dried ($MgSO_4$) and concentrated. Distillation of the residue gave the product as an amber resin consisting of a mixture of 3-(1-methylenyl-2-methylheptyl) and 3-(1,2-dimethylhept-1-enyl)-1-hydroxy-7,8,9,10-tetrahydro-6,6,9-trimethyl-6H-dibenzo[b,d]pyran. The mixture may be separated by preparative vapor phase chromatography or by thin layer or column chromatography employing a silver nitrate impregnated adsorbent.

EXAMPLE 2

3-(1,2-Dimethylhept-1-enyl)-7,8,9,10-tetrahydro-6,6,9-trimethyl-6H-dibenzo[b,d]pyran and 3-(1-methylenyl-2-methylheptyl)-7,8,9,10-tetrahydro-6,6,9- trimethyl-6H-dibenzo[b,d]pyran

To the Grignard reagent prepared from 13.3 g. (0.56 mol.) of magnesium turnings and 100 g. (0.56 mol.) of 2-bromoheptane in anhydrous ether, under nitrogen, is added with stirring a solution of 41.5 g. (0.28 mol.) of m-methoxyacetophenone in 200 ml. of anhydrous tetrahydrofuran. After refluxing for 12 hours the mixture is quenched with 300 ml. of saturated aqueous ammonium chloride and extracted with ether. The extracts are washed with water, dried (MgSO$_4$) and the solvent is removed to give 3-(1,2-dimethyl-1-hydroxyheptyl)phenol methyl ether as an oil. Dehydration, removal of the protective group and separation of the isomers is accomplished according to the procedure described in Example 1.

Condensation of equivalent amounts of a mixture of 3-(1,2-dimethylhept-1-enyl)phenol and 3-(1-methylenyl-2-methylheptyl)phenol and 5-methyl-2-carbethoxycyclohexanone followed by treatment of the dibenzo[b,d]pyrones with methyl magnesium bromide and subsequent cyclization according to the procedure of Example 1 gives the title compounds.

EXAMPLE 3

3-(1,2-Dimethyldec-1-enyl)-1-hydroxy-7,8,9,10-tetrahydro-6,6,9-trimethyl-6H-dibenzo[b,d]pyran and 3-(1-methylenyl-2-methyldecyl)-1-hydroxy-7,8,9,10-tetrahydro-6,6,9-trimethyl-6H-dibenzo[b,d]pyran Substitution of equivalent amounts of 3,5-dimethoxyacetophenone [J. Prakt. Chem. 107:104 (1924)] and 2-bromodecane in the procedure of Example 2 for m-methoxyacetophenone and 2-bromoheptane, respectively, followed by dehydration and removal of the protective groups as described in Example 1 gives 5-(1,2-dimethyldec-1-enyl)resorcinol and 5-(1-methylenyl-2-methyldecyl)-resorcinol.

Condensation of equivalent amounts of a mixture of 5-(1,2-dimethyldec-1-enyl)resorcinol and 5-(1-methylenyl-2-methyldecyl)resorcinol and 5-methyl-2-carbethoxycyclohexanone followed by treatment of the dibenzo[b,d]pyrones with methyl magnesium bromide and subsequent cyclization according to the procedure of Example 1 gives the title compounds.

EXAMPLE 4

3-(1-Pentenyl)-1-hydroxy-7,8,9,10-tetrahydro-6,6,9-trimethyl-6H-dibenzo[b,d]pyran A solution of 0.46 mol. of 3,5-dimethoxyphenyl n-butyl ketone in 50 ml. of methanol was added dropwise with stirring to a solution of 18 g. of sodium borohydride in 300 ml. of methanol containing 1 g. of sodium hydroxide. The mixture is refluxed for 30 minutes then concentrated. Water is added to the residue and the aqueous solution is extracted with ether. The extracts are combined, dried (MgSO$_4$) and concentrated to give 5-(1-hydroxypentyl)-resorcinol dimethyl ether. The 5-(1-hydroxypentyl)-resorcinol dimethyl ether is dehydrated and the protective groups are removed by the method described in Example 1 to give 5-(1-pentenyl)resorcinol.

Condensation of equivalent amounts of 5-(1-pentenyl)resorcinol and 5-methyl-2-carbethoxycyclohexanone followed by treatment of the dibenzo[b,d]pyrone with methyl magnesium bromide and subsequent cyclization according to the procedure of Example 1 gives the title compound.

EXAMPLE 5

3-(1,1,2-Trimethylhept-2-enyl)-1-hydroxy-7,8,9,10-tetrahydro-6,6,9-trimethyl-6H-dibenzo[b,d]pyran and 3-(1,1-dimethyl-2-methylenylheptyl)-1-hydroxy-7,8,9,10-tetrahydro-6,6,9-trimethyl-6H-dibenzo[b,d]pyran To 0.2 mol. of methyl magnesium bromide (2N in tetrahydrofuran-benzene), under nitrogen, is added 55.6 g. (0.2 mol.) of 2-(3,5-dimethoxyphenyl)-2-methyloct-3-one [J. Amer. Chem. Soc. 70:664 (1948); Helv. Chem. Acta 52:1116 (1969)] in tetrahydrofuran. After refluxing for 12 hours the mixture is quenched with saturated aqueous ammonium chloride and extracted with ether. The extracts are washed with water, dried (MgSO$_4$) and the solvent is removed to give the carbinol as an oil. A solution of 5.9 g. (0.020 mol.) of the carbinol in ether is allowed to react over a 6 hour period with a suspension of 0.8 g. (0.020 mol.) of metallic potassium in 60 ml. of ether. Carbon disulfide (1.5 g.; 0.020 mol.) is added and the mixture is stirred for 30 minutes, then 2.8 g. (0.020 mol.) of methyl iodide is added and the reaction mixture is refluxed for 6 hours then left to stand at 25° for 12 hours. The mixture is filtered and the filtrate is concentrated and distilled in vacuo. The distillate is dissolved in ethanol, refluxed with Raney nickel and redistilled to give a mixture of 5-(1,1,2-trimethylhept-2-enyl)resorcinol dimethyl ether and 5-(1,1-dimethyl-2-methylenylheptyl)-resorcinol dimethyl ether. Removal of the protective groups is accomplished as described in Example 1 to give 5-(1,1,2-trimethylhept-2-enyl)resorcinol and 5-(1,1-dimethyl-2-methylenylheptyl)resorcinol.

Condensation of equivalent amounts of a mixture of 5-(1,1,2-trimethylhept-2-enyl)resorcinol and 5-(1,1-dimethyl-2-methylenylheptyl)resorcinol and 5-methyl-2-carbethoxycyclohexanone followed by treatment of the dibenzo[b,d]pyrones with methyl magnesium bromide and subsequent cyclization according to the procedure of Example 1 gives the title compounds.

EXAMPLE 6

3-(1-Ethyl-2-methylhept-1-enyl)-1-hydroxy-7,8,9,10-tetrahydro-6,6,9-trimethyl-6H-dibenzo[b,d]pyran and 3-[1-(2-ethylenyl)-2-methylheptyl]-1-hydroxy-7,8,9,10-tetrahydro-6,6,9-trimethyl-6H-dibenzo[b,d]pyran Substitution of an equivalent amount of 3,5-dimethoxyphenyl ethyl ketone in the procedure of Example 2 for m-methoxyacetophenone followed by dehydration and removal of the protective groups by the method described in Example 1 gives 5-(1-ethyl-2-methylhept-1-enyl)resorcinol and 5-[1-(2-ethylenyl)-2-methylheptyl]resorcinol.

Condensation of equivalent amounts of a mixture of 5-(1-ethyl-2-methylhept-1-enyl)resorcinol and 5-[1-(2-ethylenyl)-2-methylheptyl]resorcinol and 5-methyl-2-carbethoxycyclohexanone followed by treatment of the dibenzo[b,d]pyrones with methyl magnesium bromide and subsequent cyclization according to the procedure of Example 1 gives the title compounds.

EXAMPLE 7

3-(1-Methylhept-1-enyl)-1-hydroxy-7,8,9,10-tetrahydro-6,6,9-trimethyl-6H-dibenzo[b,d]pyran and 3-(1-methylenylheptyl)-1-hydroxy-7,8,9,10-tetrahydro-6,6,9-trimethyl-6H-dibenzo[b,d]pyran Substitution of equivalent amounts of 3,5-dimethoxyacetophenone and 1-bromohexane in the procedure of Example 2 for m-methoxyacetophenone and 2-bromoheptane, respectively, followed by dehydration and removal of the protective groups as described in Example 1 gives 5-(1-methylheptyl)resorcinol and 5-(1-methylenylheptyl)resorcinol.

Condensation of equivalent amounts of a mixture of 5-(1-methylheptyl)resorcinol and 5-(1-methylenylheptyl)-resorcinol and 5-methyl-2-carbethoxycyclohexanone followed by treatment of the dibenzo[b,d]pyrones with methyl magnesium bromide and subsequent cyclization according to the procedure of Example 1 gives the title compounds.

EXAMPLE 8

3-(1-Methylhept-5-enyl)-1-hydroxy-7,8,9,10-tetrahydro-6,6,9-trimethyl-6H-dibenzo[b,d]pyran To the Grignard reagent prepared from 4.8 g. (0.20 mol.) of magnesium turnings and 32.6 g. (0.20 mol.) of a mixture of cis and trans-4-hexen-1-ol [J. Amer. Chem. Soc. 86:3759 (1964)] in anhydrous ether is added with stirring a solution of 10.9 g. (0.10 mol.) of 3,5-dimethoxyacetophenone in anhydrous tetrahydrofuran. After refluxing for 4 hours the reaction mixture is poured into ice-water and neutralized with aqueous ammonium chloride. The aqueous solution is extracted three times with ether and the combined extracts are washed with water, dried (MgSO$_4$) and concentrated in vacuo to give 5-(1-hydroxy-1-methylhept-5-enyl)resorcinol dimethyl ether.

A solution of 13.2 g. (0.05 mol.) of the carbinol in anhydrous ether is added dropwise to a solution of 3.3 g. (0.088 mol.) of lithium aluminum hydride and 23 g. (0.18 mol.) of aluminum chloride in ether. The reaction mixture is refluxed for 30 minutes, then it is cooled to 0°, treated with an excess of methyl formate in ether and decomposed with 20% aqueous sodium hydroxide. The layers are separated and the aqueous phase is extracted three times with ether. The combined organic solutions are washed with water, dried (MgSO$_4$) and concentrated to give 5-(1-methylhept-5-enyl)resorcinol dimethyl ether. Removal of the protective groups as described in Example 1 gives 5-(1-methylhept-5-enyl)resorcinol.

Condensation of equivalent amounts of 5-(1-methylhept-5-enyl)resorcinol and 5-methyl-2-carbethoxycyclohexanone followed by treatment of the dibenzo[b,d]-pyrone with methyl magnesium bromide and subsequent cyclization according to the procedure of Example 1 gives the title compound.

EXAMPLE 9

3-(1,2-Dimethylhept-1-enyl)-1-hydroxy-6a,7,10,10a-tetrahydro-6,6,9-trimethyl-6H-dibenzo[b,d]pyran To a stirred solution of 0.23 g. (1.4 mmol.) of dry p-toluenesulfonic acid and 2.3 g. (10 mmol.) of 5-(1,2-dimethylhept-1-enyl)resorcinol in 500 ml. of chloroform is added a solution of 1.9 g. (13.5 mmol.) of cis-verbenol [J. Chem. Soc. 2864 (1960)] in 200 ml. of chloroform over a 50 minute interval. The reaction mixture is stirred for 30 minutes, then ether and water are added and the layers are separated. The organic phase is washed with 5% aqueous sodium bicarbonate, dried (MgSO$_4$) and concentrated in vacuo. The residue is chromatographed on Florisil and eluted with 5% etherpetroleum ether to give 2,6-dihydroxy-4-(1,2-dimethylhept-1-enyl)-1-verbenylbenzene (1.5 g.) which is dissolved in 100 ml. of methylene chloride containing 1 ml. of boron trifluoride etherate. After 30 minutes ether and water are added and the layers are separated. The aqueous phase is extracted twice with ether and the combined extracts are washed with 5% aqueous sodium bicarbonate, dried (MgSO$_4$) and concentrated in vacuo. Chromatography of the residue on Florisil and elution with 2% etherpetroleum ether gives the title compound.

EXAMPLE 10

3-(1,2-Dimethylhept-1-enyl)-1-hydroxy-6a,7,8,10a-tetrahydro-6,6,9-trimethyl-6H-dibenzo[b,d]pyran Dry hydrogen chloride gas is bubbled into a solution of 4.8 g. (13 mmol.) of 3-(1,2-dimethylhept-1-enyl)-1-hydroxy-6a,7,10,10a-tetrahydro-6,6,9-trimethyl-6H-dibenzo[b,d]pyran in 250 ml. of dry toluene containing 0.5 g. (3.7 mmol.) of anhydrous zinc chloride at −5° to −15° for 6 hours. The reaction mixture is filtered and the filtrate washed with water until neutral, dried (MgSO$_4$) and concentrated in vacuo at 25°. The residue is dried for 12 hours at 25° under vacuum to give 3-(1,2-dimethylhept-1-enyl)-1-hydroxy-6a,7,8,10,10a-pentahydro-9-chloro-6,6,9-trimethyl-6H-dibenzo[b,d]pyran.

To a 1M solution of potassium t-amylate in 10 ml. of benzene under an argon atmosphere at 5° is added dropwise with stirring a solution of 3.1 mmol. of the 9-chloro-dibenzo[b,d]pyran in 15 ml. of dry benzene. The reaction mixture is heated to 65° for 15 minutes, then it is cooled in an ice bath and bubbled with carbon dioxide for 30 minutes. Ether and ice water are added and the mixture is neutralized with 5% aqueous sodium bicarbonate. The layers are separated and the organic phase is dried (MgSO$_4$) and concentrated in vacuo to give the title compound.

EXAMPLE 11

3-(1,2-Dimethylhept-1-enyl)-1-hydroxy-6,6,9-trimethyl-6H-dibenzo[b,d]pyran

A solution of 2.0 g. of 3-(1,2-dimethylhept-1-enyl)-1-hydroxy-7,8,9,10-tetrahydro-6,6,9-trimethyl-6H-dibenzo[b,d]pyran in 70 ml. of dry p-cymene is added dropwise at reflux to a well stirred suspension of 660 mg. of 10% palladium on carbon in 70 ml. of dry p-cymene, which is bubbled continuously with nitrogen. The addition is made over 45 minutes. Refluxing is continued for an additional hour and the mixture is then cooled, chloroform is added and the catalyst is filtered off. The chloroform solution is concentrated in vacuo and the residue is chromatographed on a silica gel "dry-column" using 6:4 chloroform-cyclohexanone as the eluant. The fractions are eluted and distilled to give the title compound.

In like manner, the title compound may be obtained from 3-(1,2-dimethylhept-1-enyl)-1-hydroxy-6a,7,8,10a-tetrahydro-6,6,9-trimethyl-6H-dibenzo[b,d]-pyran or from 3-(1,2-dimethylhept-1-enyl)-1-hydroxy-6a,7,10,10a-tetrahydro-6,6,9-trimethyl-6H-dibenzo[b,d]-pyran.

EXAMPLE 12

When equivalent amounts of 4-methyl-2-carbethoxycyclohexanone and 5-(1,2-dimethylhept-1-enyl)resorcinol are condensed according to the procedure of Example 1 and the resulting dibenzo[b,d]pyrone is reacted with methyl magnesium bromide and cyclized as described, 3-(1,2-dimethylhept-1-enyl)-1-hydroxy-7,8,9,10-tetrahydro-6,6,8-trimethyl-6H-dibenzo[b,d]pyran is obtained.

In a similar manner, 3-(1,2-dimethylhept-1-enyl)-1-hydroxy-7,8,9,10-tetrahydro-6,6,7-trimethyl-6H-dibenzo[b,d]pyran is obtained from 3-methyl-2-carbethoxycyclohexanone and 5-(1,2-dimethylhept-1-enyl)resorcinol.

Likewise, 3-(1,2-dimethylhept-1-enyl)-1-hydroxy-7,8,9,10-tetrahydro-6,6,10-trimethyl-6H-dibenzo[b,d]pyran is prepared from 6-methyl-2-carbethoxycyclohexanone and 5-(1,2-dimethylhept-1-enyl)resorcinol.

EXAMPLE 13

3-(1,2-Dimethylhept-1-enyl)-1-hydroxy-7,8,9,10-tetrahydro-6,6-dimethyl-6H-dibenzo[b,d]pyran Condensation of 5-(1,2-dimethylhept-1-enyl)resorcinol with an equivalent amount of 2-carbethoxycyclohexanone according to the procedure of Example 1 followed by reaction of the dibenzo[b,d]pyrone and cyclization as previously described gives the title compound.

EXAMPLE 14

3-(1,2-Dimethylhept-1-enyl)-1-hydroxy-7,8,9,10-tetrahydro-9-ethyl-6,6-dimethyl-6H-dibenzo[b,d]pyran When an equivalent amount of 5-ethyl-2-carbethoxycyclohexanone is substituted in the procedure of Example 1 for 5-methyl-2-carbethoxycyclohexanone, the title compound is obtained.

EXAMPLE 15

3-(1,2-Dimethylhept-1-enyl)-1-hydroxy-7,8,9,10-tetrahydro-9-methyl-6,6-diethyl-6H-dibenzo[b,d]pyran When 3-(1,2-dimethylhept-1-enyl)-1-hydroxy-7,8,9,10-tetrahydro-9-methyl-6H-dibenzo[b,d]pyrone is reacted with ethyl magnesium bromide and cyclized according to the procedure described in Example 1, the title compound is obtained.

EXAMPLE 16

When an equivalent amount of a phenol or resorcinol listed below:
  5-(1-methylenyl-2-methylheptyl)resorcinol
  3-(1,2-dimethylhept-1-enyl)phenol
  5-(1-pentenyl)resorcinol
  5-(1,1,2-trimethylhept-2-enyl)resorcinol
  5-(1-ethyl-2-methylhept-1-enyl)resorcinol
  5-(1-methylhept-5-enyl)resorcinol
is substituted in the procedure of Example 12 for 5-(1,2-dimethylhept-1-enyl)resorcinol, the following dibenzo[b,d]-pyrans are obtained:
  3-(1-methylenyl-2-methylheptyl)-1-hydroxy-7,8,9,10-tetrahydro-6,6,8-trimethyl-6H-dibenzo[b,d]-pyran
  3-(1,2-dimethylhept-1-enyl)-7,8,9,10-tetrahydro-6,6,8-trimethyl-6H-dibenzo[b,d]pyran
  3-(1-pentenyl)-1-hydroxy-7,8,9,10-tetrahydro-6,6,8-trimethyl-6H-dibenzo[b,d]pyran
  3-(1,1,2-trimethylhept-2-enyl)-1-hydroxy-7,8,9,10-tetrahydro-6,6,8-trimethyl-6H-dibenzo[b,d]pyran
  3-(1-ethyl-2-methylhept-1-enyl)-1-hydroxy-7,8,9,10-tetrahydro-6,6,8-trimethyl-6H-dibenzo[b,d]-pyran
  3-(1-methylhept-5-enyl)-1-hydroxy-7,8,9,10-tetrahydro-6,6,8-trimethyl-6H-dibenzo[b,d]pyran.

In like manner, the corresponding 6,6,7-trimethyl and 6,6,10-trimethyl-6H-dibenzo[b,d]pyrans are obtained.

EXAMPLE 17

Substitution of an equivalent amount of a resorcinol or phenol listed in Example 16 pyran. the procedure of Example 13 for 5-(1,2-dimethylhept-1-enyl)resorcinol gives the following dibenzo[b,d]pyrans:
  3-(1-methylenyl-2-methylheptyl)-1-hydroxy-7,8,9,10-tetrahydro-6,6-dimethyl-6H-dibenzo[b,d]pyran
  3-(1,2-dimethylhept-1-enyl)-7,8,9,10-tetrahydro-6,6-dimethyl-6H-dibenzo[b,d]pyran
  3-(1-pentenyl)-1-hydroxy-7,8,9,10-tetrahydro-6,6-dimethyl-6H-dibenzo[b,d]pyran
  3-(1,1,2-trimethylhept-2-enyl)-1-hydroxy-7,8,9,10-tetrahydro-6,6-dimethyl-6H-dibenzo[b,d]pyran
  3-(1-ethyl-2-methylhept-1-enyl)-1-hydroxy-7,8,9,10-tetrahydro-6,6-dimethyl-6H-dibenzo[b,d]pyran
  3-(1-methylhept-5-enyl)-1-hydroxy-7,8,9,10-tetrahydro-6,6-dimethyl-6H-dibenzo[b,d]pyran.

EXAMPLE 18

Substitution of an equivalent amount of a resorcinol or phenol listed in Example 16 in the procedure of Example 14 for 5-(1,2-dimethylhept-1-enyl)resorcinol gives the corresponding dibenzo[b,d]pyrans listed below:
  3-(1-methylenyl-2-methylheptyl)-1-hydroxy-7,8,9,10-tetrahydro-9-ethyl-6,6-dimethyl-6H-dibenzo[b,d]pyran
  3-(1,2-dimethylhept-1-enyl)-7,8,9,10-tetrahydro-9-ethyl-6,6-dimethyl-6H-dibenzo[b,d]pyran
  3-(1-pentenyl)-1-hydroxy-7,8,9,10-tetrahydro-9-ethyl-6,6-dimethyl-6H-dibenzo[b,d]pyran
  3-(1,1,2-trimethylhept-2-enyl)-1-hydroxy-7,8,9,10-tetrahydro-9-ethyl-6,6-dimethyl-6H-dibenzo[b,d]pyran
  3-(1-ethyl-2-methylhept-1-enyl)-1-hydroxy-7,8,9,10-tetrahydro-9-ethyl-6,6-dimethyl-6H-dibenzo[b,d]pyran
  3-(1-methylhept-5-enyl)-1-hydroxy-7,8,9,10-tetrahydro-9-ethyl-6,6-dimethyl-6H-dibenzo[b,d]pyran.

EXAMPLE 19

Substitution of an equivalent amount of a phenol or resorcinol listed in Example 16 in the procedure of Example 15 for 5-(1,2-dimethylhept-1-enyl)resorcinol gives the corresponding dibenzo[b,d]pyrans listed below:
  3-(1-methylenyl-2-methylheptyl)-1-hydroxy-7,8,9,10-tetrahydro-9-methyl-6,6-diethyl-6H-dibenzo[b,d]-pyran
  3-(1,2-dimethylhept-1-enyl)-7,8,9,10-tetrahydro-9-methyl-6,6-diethyl-6H-dibenzo[b,d]pyran
  3-(1-pentenyl)-1-hydroxy-7,8,9,10-tetrahydro-9-methyl-6,6-diethyl-6H-dibenzo[b,d]pyran
  3-(1,1,2-trimethylhept-2-enyl)-1-hydroxy-7,8,9,10-tetrahydro-9-methyl-6,6-diethyl-6H-dibenzo[b,d]pyran
  3-(1-ethyl-2-methylhept-1-enyl)-1-hydroxy-7,8,9,10-tetrahydro-9-methyl-6,6-diethyl-6H- dibenzo[b,d]pyran
3-(1-methylhept-5-enyl)-1-hydroxy-7,8,9,10-tetrahydro-9-ethyl-6,6-dimethyl-6H-dibenzo[b,d]pyran.

EXAMPLE 20

By the procedure of Example 11, the dibenzo[b,d]pyrans listed below:
3-(1-methylenyl-2-methylheptyl)-1-hydroxy-7,8,9,10-tetrahydro-6,6,9-trimethyl-6H-dibenzo[b,d]pyran
3-(1,2-dimethylhept-1-enyl)-7,8,9,10-tetrahydro-6,6,9-trimethyl-6H-dibenzo[b,d]pyran
3-(1-pentenyl)-1-hydroxy-7,8,9,10-tetrahydro-6,6,9-trimethyl-6H-dibenzo[b,d]pyran
3-(1,1,2-trimethylhept-2-enyl)-1-hydroxy-7,8,9,10-tetrahydro-6,6,9-trimethyl-6H-dibenzo[b,d]pyran
3-(1-ethyl-2-methylhept-1-enyl)-1-hydroxy-7,8,9,10-tetrahydro-6,6,9-trimethyl-6H-dibenzo[b,d]pyran
3-(1-methylhept-5-enyl)-1-hydroxy-7,8,9,10-tetrahydro-6,6,9-trimethyl-6H-dibenzo[b,d]pyran
are dehydrogenated to give the following aromatized dibenzo[b,d]pyrans:
3-(1-methylenyl-2-methylheptyl)-1-hydroxy-6,6,9-trimethyl-6H-dibenzo[b,d]pyran
3-(1,2-dimethylhept-1-enyl)-6,6,9-trimethyl-6H-dibenzo[b,d]pyran
3-(1-pentenyl)-1-hydroxy-6,6,9-trimethyl-6H-dibenzo[b,d]pyran
3-(1,1,2-trimethylhept-2-enyl)-1-hydroxy-6,6,9-trimethyl-6H-dibenzo[b,d]pyran
3-(1-ethyl-2-methylhept-1-enyl)-1-hydroxy-6,6,9-trimethyl-6H-dibenzo[b,d]pyran
3-(1-methylhept-5-enyl)-1-hydroxy-6,6,9-trimethyl-6H-dibenzo[b,d]pyran.

In like manner, the 6a,7,8,10a-tetrahydro, 6a,7,10,-10a-tetrahydro, 6,6,8-trimethyl, 6,6,7-trimethyl, 6,6,10-trimethyl, 6,6-dimethyl, 9-methyl-6,6-diethyl and 9-ethyl-6,6-dimethyl dibenzo[b,d]pyrans disclosed herein may be dehydrogenated to the corresponding aromatic dibenzo[b,d]pyrans.

EXAMPLE 21

3-(1,2-Dimethylhept-1-enyl)-1-acetoxy-7,8,9,10-tetrahydro-6,6,9-trimethyl-6H-dibenzo[b,d]pyran A solution of 1.0 g. of 3-(1,2-dimethylhept-1-enyl)-1-hydroxy-7,8,9,10-tetrahydro-6,6,9-trimethyl-6H-dibenzo[b,d]pyran in 20 ml. of acetic anhydride containing 0.5 g. of sodium acetate is refluxed for 5 hours. The excess anhydride is evaporated in vacuo and the residue dissolved in water and extracted with ether. The extract is washed with water until neutral, then dried and evaporated to give an oil, which is chromatographed on a silica gel "dry-column" using 1:1 benzene-cyclohexane as eluant. Distillation in vacuo gives the title compound.

EXAMPLE 22

By the procedure of Example 21, using propionic anhydride in place of acetic anhydride, the product is 3-(1,2-dimethylhept-1-enyl)-1-propionyloxy-7,8,9,10-tetrahydro-6,6,9-trimethyl-6H-dibenzo[b,d]pyran.

Similarly, using n-butyric anhydride, the product is 3-(1,2-dimethylhept-1-enyl)-1-n-butyryloxy-7,8,9,10-tetrahydro-6,6,9-trimethyl-6H-dibenzo[b,d]pyran.

By the same procedure, using n-valeric anhydride, the product is 3-(1,2-dimethylhept-1-enyl)-1-n-valeryloxy-7,8,9,10-tetrahydro-6,6,9-trimethyl-6H-dibenzo[b,d]pyran.

EXAMPLE 23 when an equivalent amount of a 1-hydroxy dibenzo[b,d]pyran listed in Example 20 is substituted in the procedure of Example 21 for 3-(1,2-dimethylhept-1-enyl)-1-hydroxy-7,8,9,10-tetrahydro-6,6,9-trimethyl-6H-dibenzo[b,d]pyran, the following 1-acetoxy dibenzo[b,d]pyrans are obtained:
3-(1-methylenyl-2-methylheptl)-1-acetoxy-7,8,9,10-tetrahydro-6,6,9-trimethyl-6H-dibenzo[b,d]pyran
3-(1-pentenyl)-1-acetoxy-7,8,9,10-tetrahydro-6,6,9-trimethyl-6H-dibenzo[b,d]pyran
3-(1,1,2-trimethylhept-2-enyl)-1-acetoxy-7,8,9,10-tetrahydro-6,6,9-trimethyl-6H-dibenzo[b,d]pyran
3-(1-ethyl-2-methylhept-1-enyl)-1-acetoxy-7,8,9,10-tetrahydro-6,6,9-trimethyl-6H-dibenzo[b,d]pyran
3-(1-methylhept-5-enyl)-1-acetoxy-7,8,9,10-tetrahydro-6,6,9-trimethyl-6H-dibenzo[b,d]pyran.

In like manner, the other 1-hydroxy dibenzo[b,d]pyrans disclosed herein may be converted to 1-acetoxy dibenzo[b,d]pyrans.

EXAMPLE 24

Substitution of an equivalent amount of a 1-hydroxy dibenzo[b,d]pyran listed in Example 20 in the procedure of Example 22 for 3-(1,2-dimethylhept-1-enyl)-1-hydroxy-7,8,9,10-tetrahydro-6,6,9-trimethyl-6H-dibenzo[b,d]pyran gives the following dibenzo[b,d]pyrans:
3-(1-methylenyl-2-methylheptyl)-1-propionyloxy-7,8,9,10-tetrahydro-6,6,9-trimethyl-6H-dibenzo[b,d]pyran
3-(1-methylenyl-2-methylheptyl)-1-n-butyryloxy-7,8,9,10-tetrahydro-6,6,9-trimethyl-6H-dibenzo[b,d]pyran
3-(1-methylenyl-2-methylheptyl)-1-n-valeryloxy-7,8,9,10-tetrahydro-6,6,9-trimethyl-6H-dibenzo[b,d]pyran
3-(1-pentenyl)-1-propionyloxy-7,8,9,10-tetrahydro-6,6,9-trimethyl-6H-dibenzo[b,d]pyran
3-(1-pentenyl)-1-n-butyryloxy-7,8,9,10-tetrahydro-6,6,9-trimethyl-6H-dibenzo[b,d]pyran
3-(1-pentenyl)-1-n-valeryloxy-7,8,9,10-tetrahydro-6,6,9-trimethyl-6H-dibenzo[b,d]pyran
3-(1,1,2-trimethylhept-2-enyl)-1-propionyloxy-7,8,9,10-tetrahydro-6,6,9-trimethyl-6H-dibenzo[b,d]pyran
3-(1,1,2-trimethylhept-2-enyl)-1-n-butyryloxy-7,8,9,10-tetrahydro-6,6,9-trimethyl-6H-dibenzo[b,d]pyran
3-(1,1,2-trimethylhept-2-enyl)-1-n-valeryloxy-7,8,9,10-tetrahydro-6,6,9-trimethyl-6H-dibenzo[b,d]pyran
3-(1-ethyl-2-methylhept-1-enyl)-1-propionyloxy-7,8,9,10-tetrahydro-6,6,9-trimethyl-6H-dibenzo[b,d]pyran
3-(1-ethyl-2-methylhept-1-enyl)-1-n-butyryloxy-7,8,9,10-tetrahydro-6,6,9-trimethyl-6H-dibenzo[b,d]pyran
3-(1-ethyl-2-methylhept-1-enyl)-1-n-valeryloxy-7,8,9,10-tetrahydro-6,6,9-trimethyl-6H-dibenzo[b,d]pyran
3-(1-methylhept-5-enyl)-1-propionyloxy-7,8,9,10-tetrahydro-6,6,9-trimethyl-6H-dibenzo[b,d]pyran 3-(1-methylhept-5-enyl)-1-n-butyryloxy-7,8,9,10-tetrahydro-6,6,9-trimethyl-6H-dibenzo[b,d]pyran 3-(1-methylhept-5-enyl)-1-n-valeryloxy-7,8,9,10-tetrahydro-6,6,9-trimethyl-6H-dibenzo[b,d]pyran.

Similarly, the other 1-hydroxy dibenzo[b,d]pyrans disclosed herein may be converted to 1-propionyloxy, 1-n-butyryloxy and 1-n-valeryloxy dibenzo[b,d]pyrans.

What is claimed is:

1. A compound of the formula:

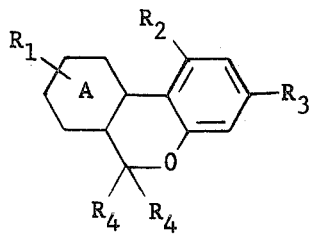

in which:
   ring A is a benzene ring or a cyclohexene ring with the double bond being at position 6a-10a, 8 or 9;
   $R_1$ is hydrogen, methyl or ethyl;
   $R_2$ is hydrogen or OR' where R' is hydrogen or lower alkanoyl of from two to five carbon atoms;
   $R_3$ is an alkenyl group optionally branched with from one to three branches, each branch consisting of one or two carbon atoms, with $R_3$ containing one double bond and having a total of from five to twelve carbon atoms; and
   $R_4$ is methyl or ethyl.

2. A compound of claim 1 where ring A is a cyclohexene ring with the double bond at the 6a-10a position and $R_3$ is an alkenyl group, optionally branched with from one to three methyl groups, with $R_3$ containing one double bond and having a total of from five to 12 carbon atoms.

3. A compound of claim 2 where $R_2$ is hydroxy or acetoxy.

4. A compound of claim 3 where $R_1$ is methyl in the 9-position and $R_4$ is methyl.

5. A compound of claim 4 being the compound 3-(1,2-dimethylhept-1-enyl)-1-hydroxy-7,8,9,10-tetrahydro-6,6,9-trimethyl-6H-dibenzo[b,d]pyran.

* * * * *